(No Model.)
2 Sheets—Sheet 1.
W. J. GREGG.
STEAM TRAP.
No. 509,846.  Patented Nov. 28, 1893.
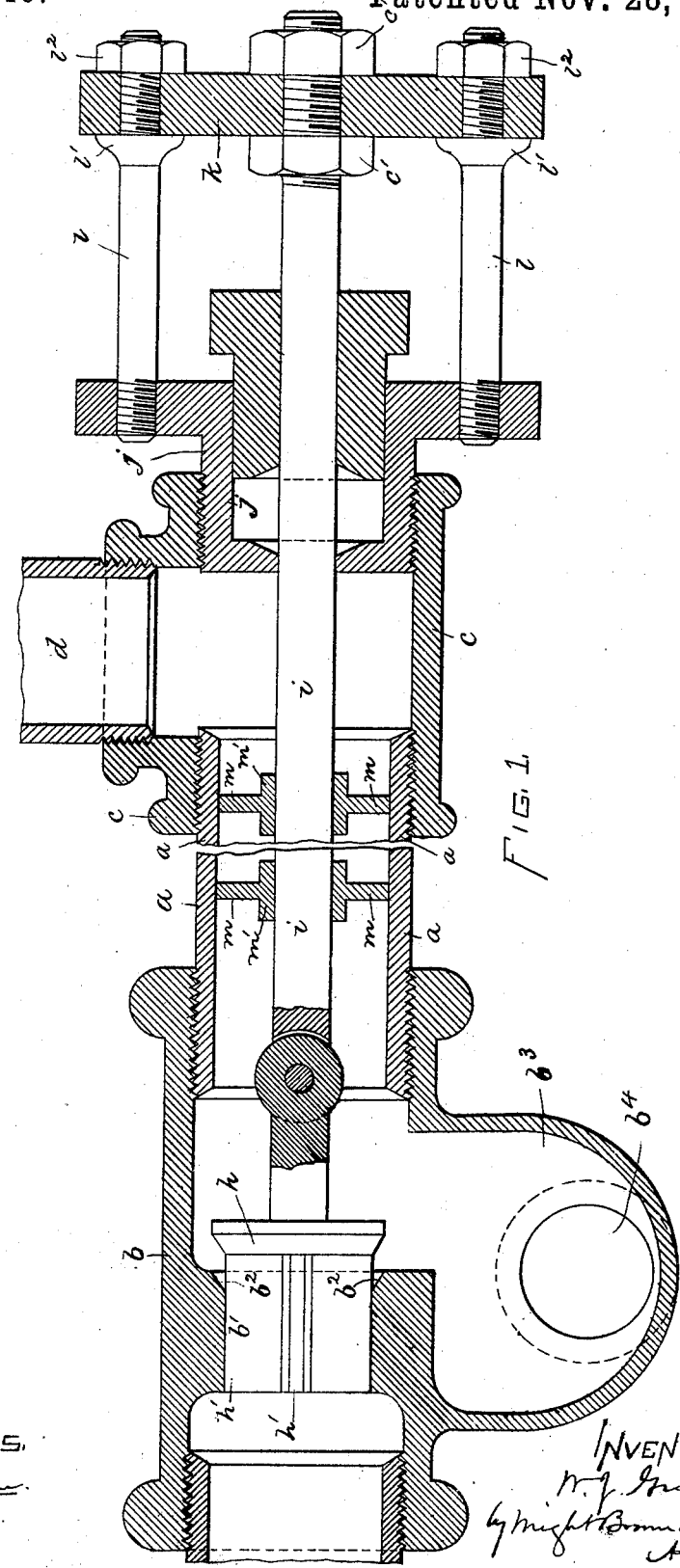

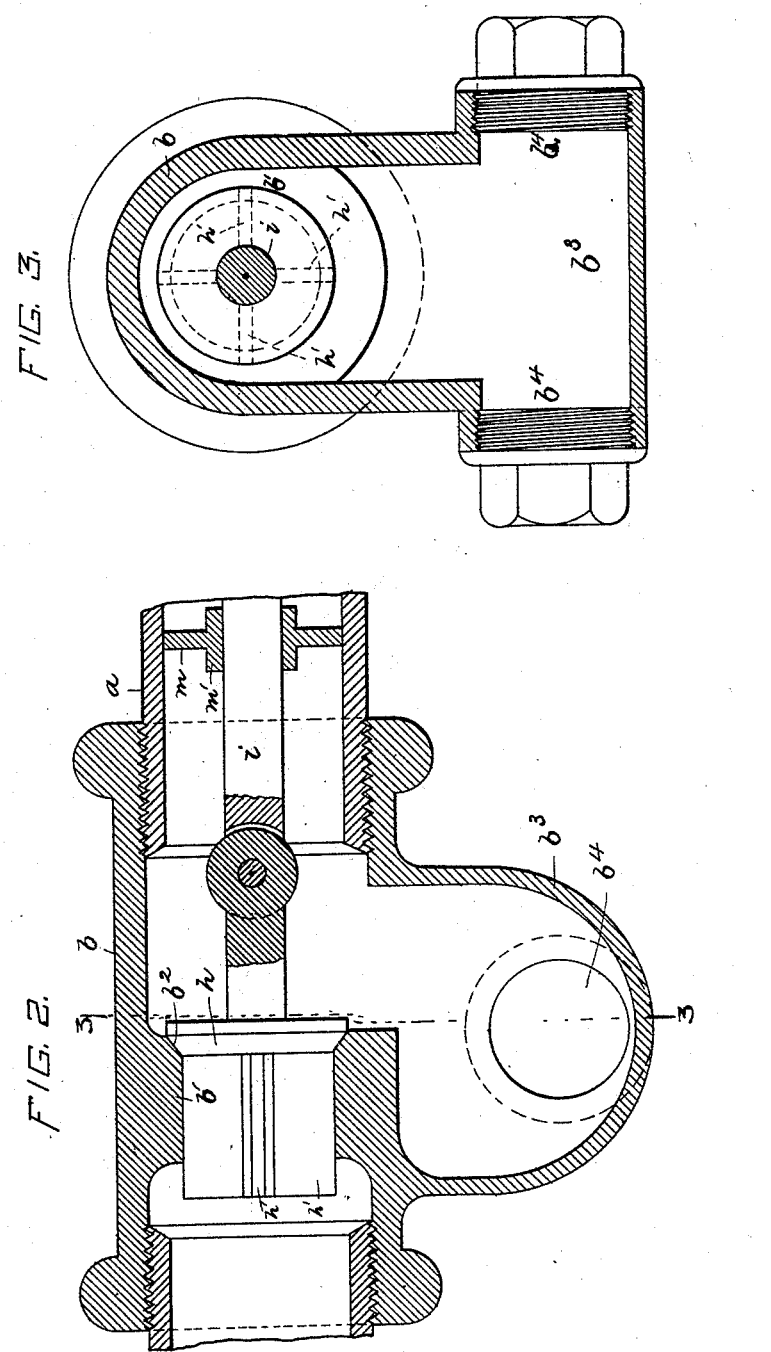

UNITED STATES PATENT OFFICE.

WILLIAM J. GREGG, OF LACONIA, NEW HAMPSHIRE.

STEAM-TRAP.

SPECIFICATION forming part of Letters Patent No. 509,846, dated November 28, 1893.

Application filed January 26, 1891. Serial No. 379,039. (No model.)

*To all whom it may concern:*

Be it known that I, WILLIAM J. GREGG, of Laconia, in the county of Belknap and State of New Hampshire, have invented certain new and useful Improvements in Steam-Traps, of which the following is a specification.

This invention has for its object to provide automatic means for venting steam pipes or conduits when the steam pressure falls below a predetermined point, so that when the steam is shut off, and before the pressure of the steam in the pipe or conduit is entirely gone, an outlet will be automatically provided for the water of condensation, thus preventing any sufficient accumulation of water in the pipe to obstruct or injure the same by freezing.

The invention also has for its object to provide a settling chamber to receive the sediment carried by the water of condensation in a steam pipe, said chamber being provided with openings having removable stoppers, through which the sediment may be removed from said chamber when desired.

To these ends the invention consists in the improvements which I will now proceed to describe and claim.

Of the accompanying drawings, forming a part of this specification, Figure 1 represents a longitudinal section of a steam pipe provided with my improvements, the valve being shown open. Fig. 2 represents a similar view showing the valve closed. Fig. 3 represents a section on line 3 3, Fig. 2.

The same letters of reference indicate the same parts in all the figures.

In the drawings: $a$ represents an iron pipe which is connected to a steam pipe or conduit, and is preferably from twelve to eighteen feet long, according to circumstances, although I do not limit myself in this particular.

$b$ represents a casing which is connected to one end of the pipe $a$. The other end of the pipe $a$ is connected to a steam pipe or conduit by any desired means, preferably by a T-coupling $c$, one branch of which receives the steam-pipe or conduit $d$, while another branch receives one end of the pipe $a$, the arrangement being such that steam passes from the conduit $d$ into the pipe $a$. The casing $b$ is internally contracted at $b'$, and on one end of said contracted portion is formed a valve seat $b^2$.

$h$ represents a valve formed to close upon the seat $b^2$, and thereby prevent the passage of steam through the casing $b$. Said valve is provided with wings or guides $h'$ which bear upon and slide in the contracted portion $b'$.

$i$ represents an elongated rod, which is preferably a tube of brass. Said rod is connected at one end to the valve $h$, and is longer than the pipe $a$, so that it extends through said pipe, and through the coupling $c$, where it passes through a stuffing box $j$ screwed into one branch of the T-coupling. The outer end of the rod $i$ is provided with nuts $c'$ $c'$ which are screwed upon the rod, and bear upon opposite sides of a cross-bar $k$ which is rigidly secured to the stuffing box by means of bolts or studs $l$ $l$ affixed to a flange $j'$ on the stuffing box, said bolts passing through orifices in the cross-bar $k$, and each being provided with a shoulder $l'$ bearing against the opposite side of said cross-bar. The nuts $c'$ $c'$ being adjustable on the rod $i$ permit the latter to be adjusted to vary the position of the valve $h$ with reference to the valve seat $b^2$. The rod $i$ is guided and kept concentric with the pipe $a$ by means of wings or arms $m$ projecting radially from rings $m'$ which are placed upon the rod $i$ at suitable intervals within the pipe $a$, the outer ends of said arms bearing upon the interior of the pipe, and being adapted to slide thereon.

The casing $b$ is provided below the valve seat $b^2$ and valve $h$ with a settling chamber $b^3$, which is arranged to receive any sediment that may be carried into the pipe $a$. At the lower portion of said chamber $b^3$ are lateral outlets $b^4$ $b^4$ which are provided with removable stoppers or plugs of any suitable construction. One of said outlets $b^4$ is located at each side of the said chamber, and the stoppers may be removed from either or both, as is convenient, when it is required to clean out the dirt and sediment deposited in the said chamber.

The operation of the apparatus is as follows: When the steam is under full pressure and there is a high degree of heat in the pipe $a$, the rod $i$ is so adjusted that the valve $h$ thereon remains closed upon its seat $b^2$. As the pressure of the steam is reduced the temperature in the pipe $a$ is, of course, correspondingly decreased, and water of condensation forms within said pipe $a$. This decrease in temperature causes the valve $h$ to open before the steam pressure is entirely relieved, the said decrease in temperature causing the rod $i$, which is made of a metal having a greater co-efficient of contraction and expansion than the metal of which the pipe $a$ is made, to contract and lift the said valve off its seat. The parts are so adjusted that the difference between the co-efficients of expansion and contraction of the pipe $a$ and rod $i$ will cause the valve to open when the pressure of the steam, and therefore the temperature, fall to a predetermined degree, and before the steam pressure has entirely left the pipe $a$. In other words, the decrease in temperature, caused by the reduction of pressure, causes the rod $i$ to contract more than the pipe $a$, owing to the different materials of which said parts are made having different co-efficients of contraction, thus opening the valve $h$ while there is still a certain amount of steam pressure in the pipe $a$. The pressure left in the said pipe $a$ suffices to blow out the water of condensation through the valve $h$. An outlet is thus provided for the water of condensation. The condensation of water and the opening of said outlet therefor being both caused by the decrease of temperature, it will be seen that it is impossible to freeze in the pipe $a$.

In practice I arrange the device above described in an inclined position. When the steam is introduced into the pipe $a$ at a certain pressure, water will soon begin to form by condensation. The water will, of course, collect at the lowermost end of said pipe, which is the end at which the valve $h$ is located, and will first cover or nearly cover said valve, the latter being held closed. As the water increases, the temperature is reduced, and the rod $i$ is thereby caused to contract and open the valve $h$, allowing the water to escape. The valve will continue to be held open until the water is blown out, and steam comes in contact with the rod, thus increasing the temperature, and causing the rod $i$ to expand and close the valve.

By means of the nuts $c'$ $c'$ the rod $i$ may be adjusted so as to open the valve at any given temperature, and when the temperature in the pipe $a$ is reduced to this given point the valve will automatically open and allow the water to escape, and will automatically close when the temperature is again raised above said given point.

I have found in practice that when, with the parts adjusted to open the valve when the pressure of steam is ten pounds, steam is let into the pipe $a$ at a pressure of forty pounds, the rod $i$ expands and the valve $h$ sits hard on its seat; then water begins to form by condensation, and, there being no outlet, the water collects in the lower portion of the pipe $a$, as before described. When sufficient water has collected to reduce the temperature to a degree equal to the degree of temperature accompanying a pressure of ten pounds, the rod will contract sufficiently to open the valve and permit the escape of water, no matter what the pressure may be above said water. It will thus be seen that the device is self-adjusting, as should sufficient water form to reduce the temperature in the pipe below a given point the valve will open and permit the escape of said water, regardless of pressure; while if the pressure is reduced below the point to which the device is adjusted the valve will be opened and steam and water will blow off, as already described.

The settling chamber $b^3$ is a feature of much importance. Located as it is at the lower end and under side of the pipe $a$, it receives a great deal of sediment that might otherwise be caught between the valve and its seat, and thus prevent the valve from properly closing.

The steam trap above described is placed in the usual relation to the steam conduit to which it is connected, and as such relation is well-known and understood, and may be variously modified, it has not been deemed necessary by me to show the same in the drawings.

I claim—

1. The combination of a casing $b$, provided with an internal valve seat, an elongated pipe $a$ connecting said casing with a source of steam supply, a valve in the casing adapted to close upon said valve seat, an elongated rod $i$ secured at one end to the valve and having guide wings $m$, and extending through a stuffing box at its other end, the cross bar $k$ secured to a flange of the stuffing box by bolts $l\,l$ and having an opening for the rod $i$, said rod being of a metal which has a different co-efficient of expansion from that in the pipe, and nuts $c'$, $c'$ on the rod each side of the cross bar whereby when the temperature of the pipe is reduced to a predetermined degree the valve will be opened, as set forth.

2. The combination of the casing $b$, having the internal valve seat, and a suitable settling chamber below said seat having an outlet or outlets provided with removable plugs, the elongated pipe $a$ connected with said casing and with a steam supply pipe, a valve adapted to close upon said seat, an elongated rod having a different co-efficient of expansion and contraction from that of the pipe $a$ connected at one end with the valve, and extending through the pipe $a$, and having rings $m'$ provided with radial arms $m$ bearing outward against the interior of the pipe $a$ the stuffing box secured to a suitable part of said pipe and receiving the rod, the cross-bar $k$ rigidly connected with the stuffing box, and having an aperture through which said rod passes, and the adjusting nuts engaged with a threaded portion of the rod, and bearing against opposite sides of said cross-bar, whereby the rod may be adjusted and secured at any desired point, as set forth.

In testimony whereof I have signed my name to this specification, in the presence of two subscribing witnesses, this 9th day of January, A. D. 1891.

WM. J. GREGG.

Witnesses:
S. S. JEWETT,
EDWIN P. THOMPSON.